United States Patent [19]

Kondou

[11] Patent Number: 5,416,570

[45] Date of Patent: May 16, 1995

[54] IMAGE FORMING APPARATUS WITH A VERTICAL TRANSPORT PORTION

[75] Inventor: Hideo Kondou, Tokyo, Japan

[73] Assignee: Ricoh Company, Ltd., Tokyo, Japan

[21] Appl. No.: 158,289

[22] Filed: Nov. 29, 1993

[30] Foreign Application Priority Data

Nov. 27, 1992 [JP] Japan ................................. 4-318665

[51] Int. Cl.$^6$ ............................................. G03G 15/00
[52] U.S. Cl. .................................... 355/321; 355/309; 347/139
[58] Field of Search ..................... 355/309, 308, 321; 271/225, 184, 9; 346/153.1, 157, 160

[56] References Cited

U.S. PATENT DOCUMENTS

| | | | |
|---|---|---|---|
| 5,049,946 | 9/1991 | Harada | 355/309 |
| 5,150,167 | 9/1992 | Gonda et al. | 355/321 X |
| 5,151,713 | 9/1992 | Kawasaki et al. | 355/309 X |
| 5,173,785 | 12/1992 | Muramatsu | 355/321 X |
| 5,208,640 | 5/1993 | Horie et al. | 271/9 X |
| 5,253,028 | 10/1993 | Gonda et al. | 355/309 |
| 5,257,070 | 10/1993 | Miller et al. | 355/321 X |
| 5,258,818 | 11/1993 | Sundquist et al. | 355/321 |

*Primary Examiner*—R. L. Moses
*Attorney, Agent, or Firm*—Oblon, Spivak, McClelland, Maier, & Neustadt

[57] ABSTRACT

An image forming apparatus has a vertical transport path formed in a transport portion, an image forming apparatus body, an original document discharge tray, an automatic document feeder and a sheet discharge device. The original document discharge tray, the automatic document feeder and the sheet discharge device are disposed above the image forming apparatus body and the transport portion is vertically disposed at one side of the image forming apparatus so as to a minimize space for installation. The transport path is able to be used as a common path for original document feeding and transfer sheet feeding, and the transport portion has a scanner portion for reading data of an original document.

23 Claims, 4 Drawing Sheets

IMAGE FORMING APPARATUS WITH A VERTICAL TRANSPORT PORTION

BACKGROUND OF THE INVENTION

1. Field of the Invention

The present invention relates to an image forming apparatus, copier or similar image forming apparatus of the type recording images on sheets, and particularly to an image forming apparatus which has a vertical transport portion.

2. Description of the Related Art

In a conventional image forming apparatus such as a copier, an image transferred sheet is discharged into a side portion of the image forming apparatus body. Such an image forming apparatus needs space for installation of the body and space at the side portion for picking up the sheet. Therefore, it aggravates the space requirement for the machine installation. Furthermore, in the case of a sorter added on the image forming apparatus, it needs a larger space for the sorter installation.

SUMMARY OF THE INVENTION

It is, therefore, an object of the present invention to provide an image forming apparatus which needs a minimum space for installation by more effectively utilizing the vertical space of the apparatus.

It is another object of the present invention to provide an image forming apparatus which has a sheet discharging device, an original document discharging tray, and an original document feeding portion, each of which is disposed directly above the image forming apparatus body. Furthermore, the image forming apparatus has a transport portion which has a transport path, and the transport portion is vertically disposed at one side position of the image forming apparatus. The transport path is used as a common path for original document feeding an for a transfer sheet feeding.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
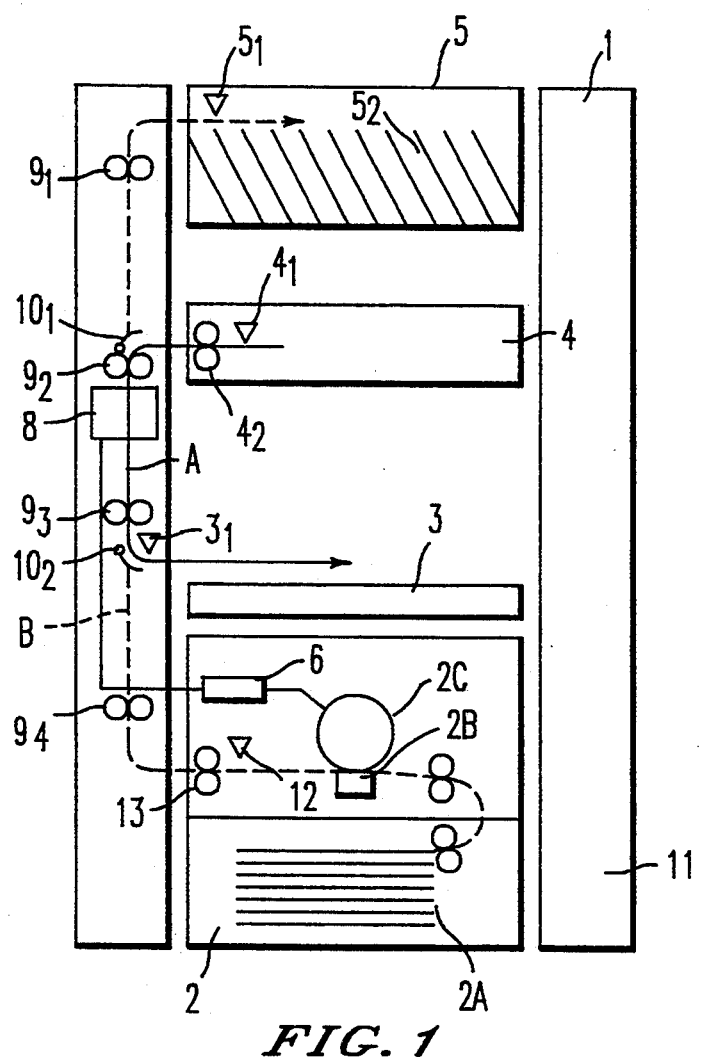
FIG. 1 is a sectional view showing an image forming apparatus embodying the present invention.
Figure 2:
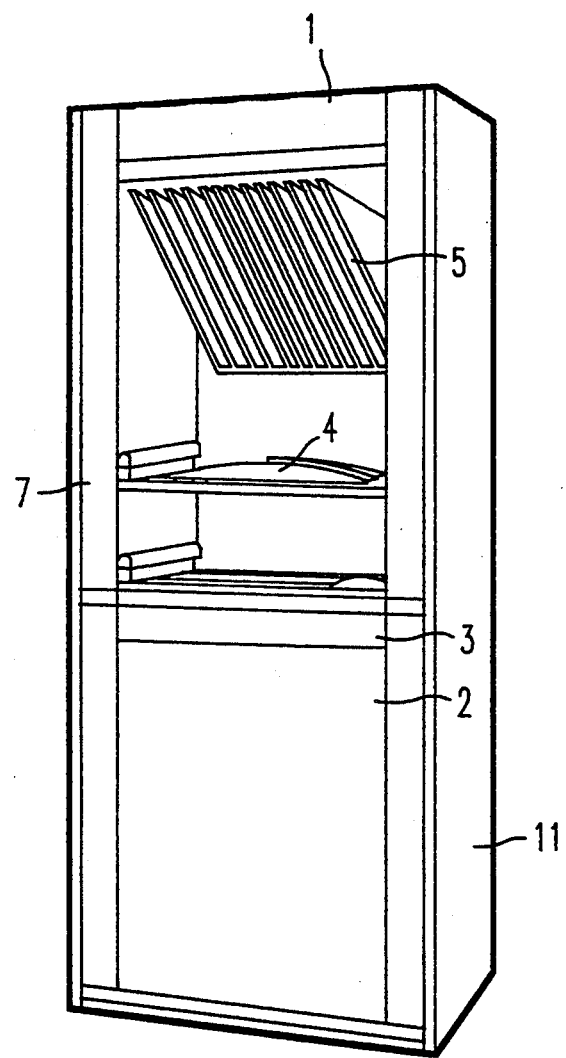
FIG. 2 is a perspective illustration showing the image forming apparatus embodying the present invention of FIG. 1.

A preferred embodiment of the present invention will hereinafter be described with reference to the drawings. FIG. 1 shows a sectional view of an image forming apparatus embodying the present invention. FIG. 2 is a perspective illustration showing the image forming apparatus of FIG. 1.

The image forming apparatus 1 embodying the present invention has a transport path, shown by a solid line A and a dash line B, vertically formed in a transport portion 7, in which the transport path is connected to main parts of the apparatus 1 for the purpose of feeding an original document sheet and an image transfer sheet. Herein, the main parts of the apparatus 1 are defined as an image forming apparatus body 2, an original document discharge tray 3 for accepting a discharged original document, an automatic document feeder 4 for feeding an original document as a document feed device, and a sheet discharge device 5 for accepting an image transfer sheet. The sheet discharge device 5 has a sorter unit. The original document discharge tray 3, the automatic document feeder 4 and the sheet discharge device 5 are disposed directly above the image forming apparatus body 2. It is also possible that the original document discharge tray 3 is disposed on the image forming apparatus body 2.

As shown in FIGS. 1 and 2, the image forming apparatus body 2 has a sheet feed portion 2A and an image forming portion 2B. The sheet feed portion 2A is disposed in the lowest position of the image forming apparatus body 2 and the image forming portion 2B is disposed above the sheet feed portion 2A. The transfer sheets are fed from the sheet feed portion 2A to the image forming portion 2B. The original document discharge tray 3, the automatic document feeder 4 and the sheet discharge device 5 are arranged in order directly above the image forming apparatus 2. A memory device 6 is disposed in the image forming apparatus body 2 and is able to store image data being sent form a scanner portion 8. The memory device 6 also has describing means, such as a polygonal mirror element or a semiconductor laser element, for describing images on a photosensitive element 2C. The scanner portion 8 is disposed in the transport portion 7, as will be described in more detail later, which is located at one side of the image forming apparatus body 2. A housing member 11 is located in an opposite position to the transport portion 7.

The automatic document feeder 4 has a sensor $4_1$ for sensing loaded original document on the automatic document feeder 4 and a pair of feed rollers $4_2$ which separate and feed one of loaded original documents. The pair of the feed rollers $4_2$ are controlled to move and stop by signals from a control portion 14 (FIG. 3) so as to automatically execute the original document feeding, as will be described later. The original document from the automatic document feeder 4 is sent to the original document discharge tray 3 via the transport portion 7. A sensor $3_1$ is disposed near the position of the entrance of the original document discharge tray 3 and the sensor $3_1$ senses the discharging of the original document onto the tray 3.

The transport portion 7 has a single transport path and is vertically disposed at one side position of the image forming apparatus body 2. The transport portion 7 is connected to the image forming apparatus body 2, the original document discharge tray 3, the automatic document feeder 4 and the sheet discharge device 5. The vertical transport path connects the image forming apparatus body 2 to the sheet discharge device 5 and connects the original document discharge tray 3 to the automatic document feeder 4, and so the transfer sheet and the original document are both transported via the transport portion 7. That is, the transport portion 7 constitutes the common transport path as a transport route A indicated by the solid line A, by which the original document is sent from the automatic document feeder 4 to the original document discharge tray 3, and a transport route B indicated by the dash line B, by which the transfer sheet is sent from the feed portion 1 to the sheet discharge device 5. The scanner portion 8 is disposed in the transport portion 7 between the automatic document feeder 4 and the original document discharge tray 3. The scanner portion 8, which has one or a plural of CCDs (not shown) as a reading device, reads the data of the original document sheet and sends the data to the memory device 6 in the image forming apparatus body 2. A latent image which is described by the memory device 6 based on the stored data in the memory device 6 is formed on the photosensitive element 2C and the latent image is developed by a developing device (not shown). The image on the photosensitive element 2C is transferred to the transfer sheet in the image forming portion 2B.

The transport portion 7 has pairs of transporting rollers $9_1$, $9_2$, $9_3$ and $9_4$ as transport means for transporting an original document or a transfer sheet, and the pairs of transporting rollers $9_2$ and $9_3$ are able to rotate in two directions based on signals from the control portion 14 corresponding to the switching of the transport path from the transport route A for the original document to the transport route B for the transfer sheet or from the transport route B to the transport route A. That is, the transport path is used for the transport route A for the original document feeding between the automatic document feeder 4 and the original document discharge tray 3, and also for the transport route B of the transfer sheet which is fed in the direction opposite to the original document feeding.

Guide devices $10_1$ and $10_2$ are provided for changing the direction of sheet feeding, and act as guide means for guiding the original document or the transfer sheet. They are constituted to be able to switch direction based on signals from the control portion 14 corresponding to the switching of the feeding for the original document or the transfer sheet. The guide device $10_1$ is disposed near the exit position of the automatic document feeder 4 and the guide device $10_2$ is disposed near the entrance position of the original document discharge tray 3.

The transfer paper from the sheet feed portion 2A disposed in the image forming apparatus body 2 is sent to the sheet discharge device 5 via the transport path in the transport portion 7 after the image data is recorded on the transfer sheet in the image forming portion 2B and the transferred image on the transfer sheet is fixed in a fixing portion (not shown). The discharged transfer sheets are accepted in approximately vertical condition in bins $5_2$ of the sheet discharge device 5 which has a plurality of the bins $5_2$ arranged vertically so as to minimize the height of the image forming apparatus 1. For the purpose of increasing transport reliability, a sensor 12 and a pair of transport rollers 13 are disposed in the exit portion for the transfer paper in the image forming apparatus body 2, and a sensor $5_2$ which senses the transferred document sent into the sheet discharge device 5 is disposed in the sheet discharge device 5.

Figure 3:
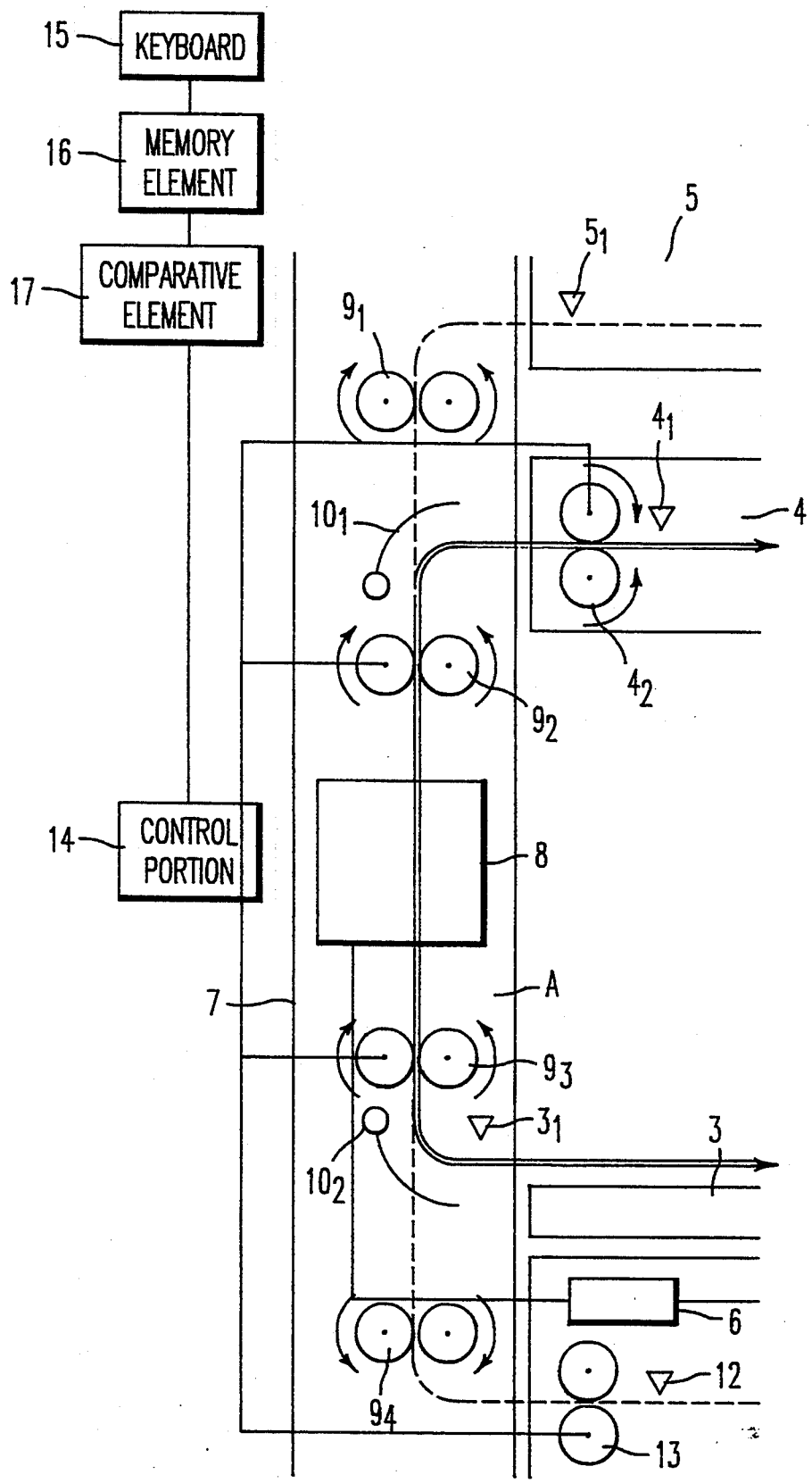
FIG. 3 is a schematic view with a block diagram, showing a transport path condition at a time when an original document is transported and data of an original document sheet are read by a scanner.
Figure 4:
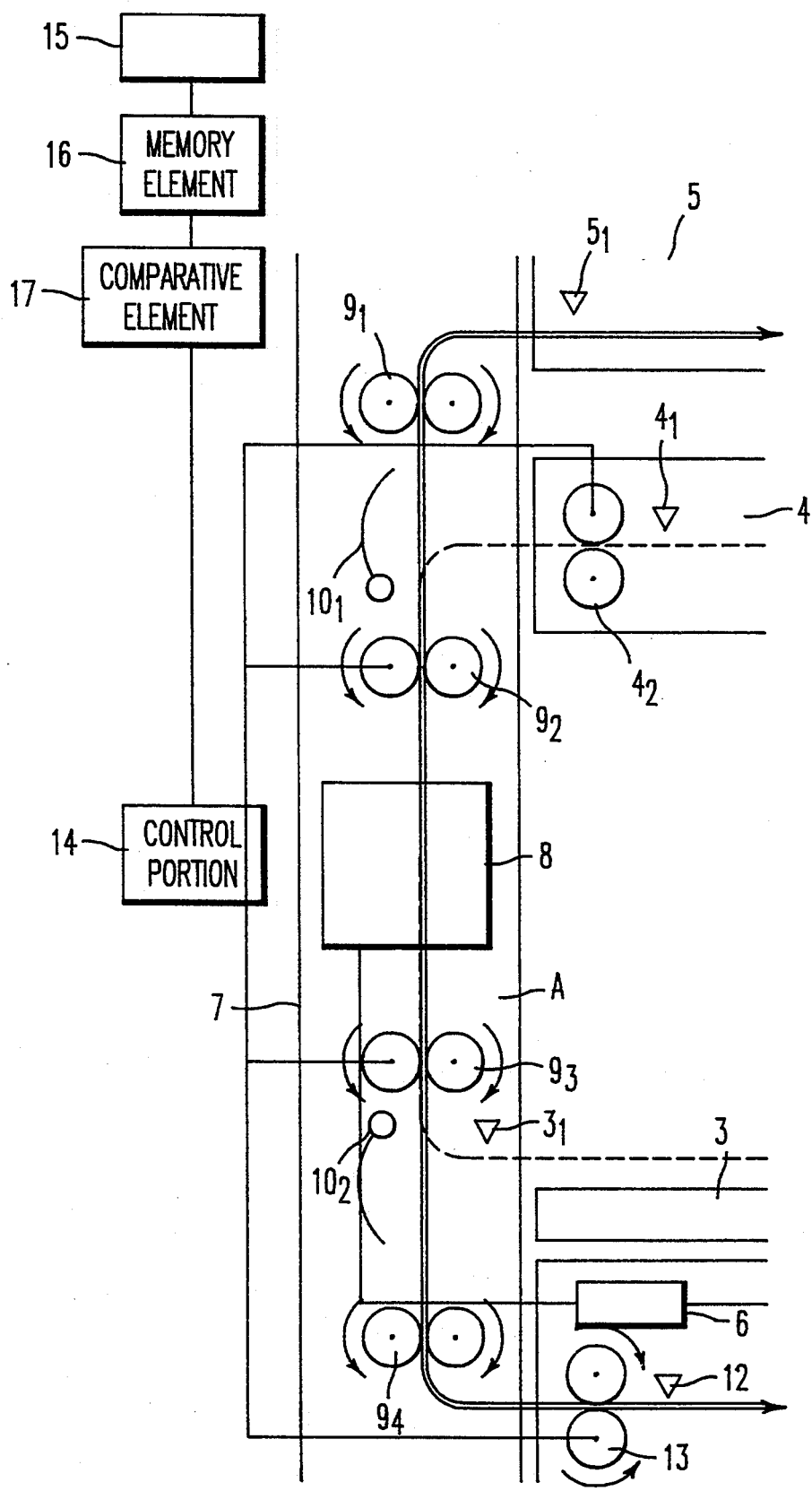
FIG. 4 is a schematic view with a block diagram, showing the transport path condition at a time when the transferred sheet is transported to an original document discharging tray.

The image forming apparatus 1 has the control portion 14 with installed CPU (not shown) so as to control the switching of the transport routes for the original document and the transfer sheet, etc. As shown in FIGS. 3 and 4, the control portion 14 is connected to a keyboard 15 via a memory element 16 and a comparative element 17. The number of transfer sheets (the number of copies to be made for each original document) is input on the keyboard 15 and is recorded in the memory element 16. So as to control and switch movements of the various elements, the control portion 14 is connected with the sensor $4_1$ which senses whether any of the original sheet remain, the pair of feed rollers $4_2$ for feeding and stopping the original document, the sensors $5_1$ which count the number of transferred sheets, the sensor 12 which senses the transfer sheet, the pair of the transport rollers 13 for feeding and stopping the transferred document, the transporting rollers $9_1$, $9_2$, $9_3$ and $9_4$ in the transport path, and the guide devices $10_1$ and $10_2$ for changing the direction of sheet feeding, etc.

It is also possible to provide other combinations of an arrangement of the original document discharge tray 3, the automatic document feeder 4 and the sheet discharge device 5 as follows:

In a first case, the sheet discharge device 5 is disposed above the original document discharge tray 3 which is on or above the image forming apparatus body 2, and the automatic document feeder 4 is disposed above the sheet discharge device 5.

In a second case, the original document discharge tray 3 is disposed above the automatic document feeder 4 on or above the image forming apparatus body 2, and the sheet discharge device 5 is disposed above the original document discharge tray 3.

In a third case, the original document discharge tray 3 is disposed above the sheet discharge device 5 which is on or above the image forming apparatus body 2, and the automatic document feeder 4 is disposed above the original document discharge tray 3.

The control methods and the operation of the above-described image forming apparatus will now be described for the case that one image transfer sheet is transferred for each original document:

The original document is set on the automatic document feeder 4 and the starting key (not shown) is stroked.

The following series operations are then automatically carried out by the control portion 14.

The sensor $4_1$ for sensing the original document which is disposed in the automatic document feeder 4, senses that original sheets remain. Then, the signals from the control portion 14 control each of the separation rollers $4_2$ and the transporting rollers $9_2$ and $9_3$ so as to rotate in the direction indicated by arrows in FIG. 3. The rollers $4_2$, $9_2$ and $9_3$ transport the original document to the original document discharge tray 3 via the scanner portion 8 disposed in the transport portion 7. In addition, the signals from the control portion control the guide devices $10_1$ and $10_2$ so as to move to the position wherein the guide devices $10_1$ and $10_2$ feed the original document along route A indicated by the bold-solid line in FIG. 3.

As the original document is guided and fed by the guide devices $10_1$–$10_2$ and the transporting roller $9_2$, the image data of the original sheet are read by the scanner portion 8 and the image data are stored in the memory device 6 disposed in the image forming apparatus body 2. FIG. 3 shows the condition of the transport portion 7 at the time when the image data of the original document sheet is read by the scanner portion 8. The image data stored in the memory device 6 is described on the photosensitive element 2C and the image formed on the photosensitive element 2C is transferred on the transfer sheet supplied from the sheet feed portion 2A.

When the original document guided by the guide device $10_2$ has been deposited on the original document discharge tray 3 via the scanner portion 8 and the transport rollers $9_2$ and $9_3$, the signals from the control portion 14 control the transporting rollers $9_2$ and $9_3$ to rotate in the direction indicated by arrows in FIG. 4 after the sensor $3_1$ detects that the original document is in the document discharge tray 3. Thereafter, the guide devices $10_2$ and $10_3$ are moved to the position in which they do not change the feed direction of the document in the feed path. The route B for feeding the transfer sheet, indicated by a bold-solid line B in FIG. 4, is thereby formed.

The image transfer sheet is transported to the sheet discharge device 5 via the transport portion 7 by rotating the transport rollers $9_1$, $9_2$, $9_3$, $9_4$ and 13 in the direction indicated by arrows in FIG. 4, corresponding to the signals from the control portion 14, when the route B for feeding the transfer sheet is formed between the image forming apparatus body 2 and the sheet discharge device 5. If the sensor $4_1$ detects remaining original documents on the automatic document feeder 4, the above-mentioned operations are repeated by the control portion 14 for each remaining original document.

In the case that a plurality of image transfer sheets are transferred for each of a plurality of original documents (i.e., more than one copy per original), the following two operation methods of the image forming apparatus are available corresponding to the established control method in the control portion:

(1). In the case that the discharge of the transfer sheets has priority:

The number of transfer sheets for each original document is input on the keyboard 15 and is recorded in the memory element 16. The starting key (not shown) is stroked.

The following series of operations are automatically carried out by the control portion 14.

The sensor $4_1$ for sensing the original document, which is disposed in the automatic document feeder 4, senses that original documents remain. Then one of the original sheets or documents is fed out from the automatic document feeder 4. The control signals from the control portion 14 control the pairs of separation rollers $4_2$ and transporting rollers $9_2$ and $9_3$ so as to rotate in the direction indicated by arrows in FIG. 3 so that they transport the original document to the original document discharge tray 3. In addition, the signals control the guide devices $10_1$ and $10_2$ so as to move to the position wherein they change the feed direction of the original document. The route A for feeding the original document is thus formed.

The image data of the original document are read by the scanner portion 8 and are stored in the memory device 6 disposed in the image forming apparatus body 2.

The signals from the control portion 14 control the transporting rollers $9_2$ and $9_3$ so as to rotate in the direction indicated by arrows in FIG. 4 after the sensor $3_1$ detects that the original document is sent to the original document discharge tray 3 via the transport portion 7. Thereafter, the guide devices $10_1$ and $10_2$ are moved to the position in which they do not change the feed direction of the document. The route B for feeding the transfer sheet is thereby formed.

The image formed on the photosensitive element 2C is then transferred to each of the predetermined number of the transfer sheets.

The image transfer sheets are transported to the sheet discharge device 5 via the transport portion 7 by rotating the transport rollers 13, $9_1$, $9_2$, $9_3$ and $9_4$ in the direction indicated by arrows in FIG. 4, corresponding to the signals from the control portion 14, when the route B for feeding the original document is formed between the image forming apparatus body 2 and the sheet discharge device 5.

The number of the discharged sheet is detected by the sensor $5_1$ disposed in the sheet discharge device 5 and the data of the discharged sheet number is sent to the comparative element 17. The comparative element 17 compares the discharged sheet number with the transfer sheet number inputted from the keyboard 15 and the transportation of a new original document is stopped until the comparative element 17 counts the predetermined number of the discharged sheets.

When the sensor $5_1$ senses that the predetermined number of sheets have been transported to the sheet discharge device 5 corresponds to the inputted transfer sheet number, the data of the comparative element 17 which indicate the completion of the transferred sheet discharge are transmitted to the control portion 14.

The control portion 14 switches the transport route B in the transport portion 7 over to the transport route A so as to feed the next original document from the automatic document feeder 4 after the determined number of transferred sheets are fed to the sheet discharge device 5. The above-mentioned operations are then repeated.

When the image forming apparatus body 2 has a storage member (not shown) for temporarily stocking transfer sheets, the image data of the original document are read by the scanner 8 and are stored in the memory device 6 disposed in the image forming apparatus body 2. At the same time, the image formed on the photosensitive element 2C is transferred onto each of the transfer sheets. Therefore, the transfer sheets are able to be immediately transported from the storage member to the sheet discharge device 5 after the original document is sent to the original document discharge tray 3. Of course, the above control method is available not only in the case of a plurality of transfer sheets, but also in the case of one transfer sheet.

(2) In the case that the reading and discharge of the original document has priority (For example, a memory has a capacity for memorizing three document originals.):

The number of transfer sheets is input on the keyboard 15 and is recorded in the memory element 16. The starting key (not shown) is stroked.

The following series of operations are then automatically controlled by the operation portion 14.

The sensor $4_1$ for sensing the original document, which is disposed in the automatic document feeder 4, senses that there remains an original document sheet. Then the pair of separation rollers $4_2$ feed the first original sheet. At the same time, the transporting rollers $9_2$ and $9_3$ in the transport portion 7 are rotated in the direction indicated by arrows in FIG. 3 and the guide devices $10_1$ and $10_2$ are moved to the position shown in FIG. 3 wherein they change the feed direction of the original document. The route A for feeding the original document is thereby formed.

The image data of the original document are read by the scanner portion 8 and are stored in the memory device 6. When the sensor $3_1$ for sensing the original document senses that the original document has been sent on the original document discharge tray 3 via the transport portion 7, a signal corresponding to sensing the original document is sent to the control portion 14.

If the sensor $4_1$ senses a second original document on the automatic document feeder 4, the control portion 14 controls the automatic document feeder 4 so as to feed the second original document. The image data of the second original document are read by the scanner portion 8 and the image data are stored in the memory device 6. The second original document is sent to the original document discharge tray 3. Then, if the sensor $4_1$ senses a third original document on the automatic document feeder 4, the control portion 14 controls the automatic document feeder 4 so as to feed the third original document. The image data of the third original document are read by the scanner portion 8 and the image data are also stored in the memory device 6.

A detection device (not shown) for detecting a remaining capacity of the memory device 6 detects that the capacity of the memory in the memory device 6 is filled by the stored data of the three original documents and the remaining capacity of the memory is zero. When the sensor $3_1$ senses the third original document has been sent onto the original document discharge tray 3 via the transport portion 7, the signals from the control portion 14 control the transporting rollers $9_2$ and $9_3$ so as to rotate in the direction indicated by arrows in FIG. 4 and the guide devices $10_1$ and $10_2$ so as to move to the position in which they do not change the feed direction of the original document. The route B for feeding the transfer sheets is thereby formed. If the number of the original documents is two or less, the above operation for forming the route B will be started after the sensor $4_1$ senses that no original document remains on the automatic document feeder 4.

Each formed image on the photosensitive element 2C is transferred onto the inputted number of the transfer sheets in the image forming portion 2. A plurality of the image transfer sheets are then transported to the sheet discharge device 5 via route B.

At the same time the number of the discharged sheet is detected by the sensor $5_1$ disposed in the sheet discharge device 5 and the data of the discharged sheet number is sent to the comparative element 17. The comparative element 17 compares the discharged sheet number with the transfer sheet number inputted form the keyboard 15, and the transportation stop of new original documents is maintained until the comparative element 17 counts up the predetermined number of the discharged sheets. Thereafter, when the comparative element 17 judges the completion of feeding the all transferred sheets to the sheet discharge device 5, if the sensor $4_1$ detects the remaining original document on the automatic document feeder 4, the above-mentioned operations are repeated by the control portion 14.

Of course, the above control method is available not only in the case of a plurality of transfer sheets, but also in the case of one transfer sheet.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An image forming apparatus, comprising:
a document feed device for feeding an original document;
an original document discharge tray for accepting an original document;
an image forming apparatus body having a sheet feed portion and an image forming portion which forms an image from a document fed from the document feed device and transfers the image to a transfer sheet from the sheet feed portion;
a sheet discharge device accepting a transfer sheet from the image forming portion, wherein the original document discharge tray, the document feed device and the sheet discharge device are disposed directly above the image forming apparatus body;
a transport portion defining a vertical transport path which is connected to the image forming apparatus body, the original document discharge tray, the document feed device and the sheet discharge device, the transport portion extending vertically and at one side of the image forming apparatus; and
a control portion, wherein said transport portion comprises transport means for transporting sheets and guide means for guiding sheets based on signals from the control portion, wherein said transport portion further comprises means for switching said vertical transport path for selectively transporting and guiding original documents from said document feed device to said document discharge tray and transporting and guiding transfer sheets from said image forming apparatus body to said sheet discharge tray.

2. An image forming apparatus, comprising:
a document feed device for feeding an original document;
an original document discharge tray for accepting an original document;
an image forming apparatus body having a sheet feed portion and an image forming portion which forms an image from a document fed from the document feed device and transfers the image to a transfer sheet from the sheet feed portion;
a sheet discharge device accepting a transfer sheet from the image forming portion, wherein the original document discharge tray, the document feed device and the sheet discharge device are disposed directly above the image forming apparatus body;
a transport portion defining a vertical transport path which is connected to the image forming apparatus body, the original document discharge tray, the document feed device and the sheet discharge device, the transport portion extending vertically and at one side of the image forming apparatus, wherein said vertical transport path comprises a common path for original document feeding and transfer sheet feeding.

3. An apparatus as claimed in claim 2, including a control portion, wherein said transport portion comprises transport means for transporting sheets and guide means for guiding sheets based on signals from the control portion, wherein said transport portion further comprises means for switching said vertical transport path for selectively transporting and guiding original documents from said document feed device to said document discharge tray and transporting and guiding transfer sheets from said image forming apparatus body to said sheet discharge tray.

4. An apparatus as claimed in claims 1 or 2, including a scanner portion which is disposed in the transport portion between the document feed device and the original document discharge tray, and said scanner reads data of the original document sheet.

5. An apparatus as claimed in claims 1 or 2, wherein said document feed device is disposed above said original document discharge tray and said sheet discharge device is disposed above said document feed device.

6. An apparatus as claimed in claims 1 or 2, wherein said sheet discharge device is disposed above said original document discharge tray and said document feed device is disposed above the sheet discharge device.

7. An apparatus as claimed in claims 1 or 2, wherein said original document discharge tray is disposed above said automatic document feeder and said sheet discharge device is disposed above said original document discharge tray.

8. An apparatus as claimed in claims 1 or 2, wherein said original document discharge tray is disposed above said sheet discharge device and said sheet discharge device is disposed above said original document discharge tray.

9. An apparatus as claimed in claim 5, wherein said document feed device is an automatic document feeder.

10. An apparatus as claimed in claim 6, wherein said document feed device is an automatic document feeder.

11. An apparatus as claimed in claim 7, wherein said document feed device is an automatic document feeder.

12. An apparatus as claimed in claim 8, wherein said document feed device is an automatic document feeder.

13. An apparatus as claimed in claims 1 or 2, wherein said sheet discharge device has a plurality of bins, each of which extends substantially vertically.

14. An apparatus as claimed in claim 4, further comprising:

a memory element which stores the data from said scanner portion.

15. An apparatus as claimed in claim 14, further comprising a comparative element which compares inputted data of a number of transfer sheets with a detected number of transfer sheets in said sheet discharge device.

16. An apparatus as claimed in claim 4, wherein said document feed device is disposed above said original document discharge tray and said sheet discharge device is disposed above said document feed device.

17. An apparatus as claimed in claim 4, wherein said sheet discharge device is disposed above said original document discharge tray and said document feed device is disposed above the sheet discharge device.

18. An apparatus as claimed in claim 4, wherein said original document discharge tray is disposed above said automatic document feeder and said sheet discharge device is disposed above said original document discharge tray.

19. An apparatus as claimed in claim 4, wherein said original document discharge tray is disposed above said sheet discharge device and said sheet discharge device is disposed above said original document discharge tray.

20. An apparatus as claimed in claim 10, wherein said document feed device is an automatic document feeder.

21. An apparatus as claimed in claim 11, wherein said document feed device is an automatic document feeder.

22. An apparatus as claimed in claim 12, wherein said document feed device is an automatic document feeder.

23. An apparatus as claimed in claim 4, wherein said sheet discharge device has a plurality of bins, each of which extends substantially vertically.

* * * * *